United States Patent [19]
Fiedler

[11] Patent Number: 5,901,603
[45] Date of Patent: May 11, 1999

[54] LIQUID LEVEL MONITOR

[75] Inventor: Robert R. Fiedler, Lincoln, Nebr.

[73] Assignee: ISCO Inc., Lincoln, Nebr.

[21] Appl. No.: 09/116,266

[22] Filed: Jul. 16, 1998

[51] Int. Cl.⁶ .................................................. G01F 23/00
[52] U.S. Cl. .............................................................. 73/299
[58] Field of Search ............................. 73/299, 300, 301, 73/302, 52, 715

[56] References Cited

U.S. PATENT DOCUMENTS

| | | | |
|---|---|---|---|
| 3,863,504 | 2/1975 | Borsanyi | 73/715 X |
| 3,897,682 | 8/1975 | Brooks | 73/715 X |
| 4,409,833 | 10/1983 | Thomson et al. | 73/299 X |
| 5,063,778 | 11/1991 | Jorritsma | 73/299 |
| 5,072,617 | 12/1991 | Weiss | 73/715 X |
| 5,107,898 | 4/1992 | Keeney | 73/299 X |
| 5,519,638 | 5/1996 | Tiao | 73/301 X |
| 5,661,228 | 8/1997 | Young | 73/52 X |

*Primary Examiner*—Elizabeth L. Dougherty
*Attorney, Agent, or Firm*—Henderson & Sturm

[57] ABSTRACT

A liquid level monitor using a pressure actuated sensor to replace the open bubble tube. Air flows down the supply tube as in the bubbler, but rather than being released into the water, the air enters a chamber that has one movable wall, such as a diaphragm, that is acted on from the inside by pressurized air and from the outside by the hydrostatic head of the water. When the water pressure exceeds the chamber air pressure, the movable wall is pressed against an air outlet and does not allow air in the chamber to escape through the air outlet. One embodiment uses a diaphragm disposed over the air outlet; however, the concept may be extended to several other movable members, such as a piston with low actuation force. When the air chamber pressure exceeds the water pressure, the movable member moves away from the air outlet, releasing air and causing the chamber pressure to drop down to the water pressure.

7 Claims, 2 Drawing Sheets

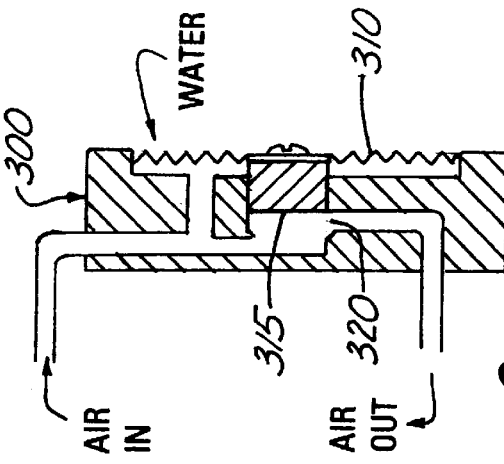
Fig. 6
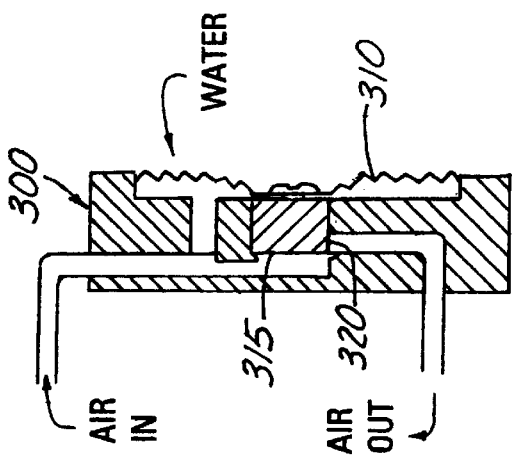
Fig. 5
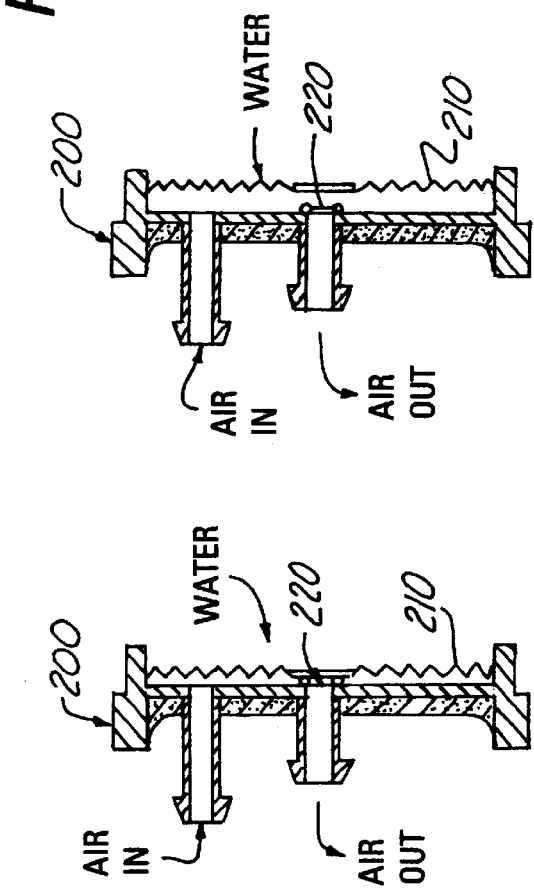
Fig. 4
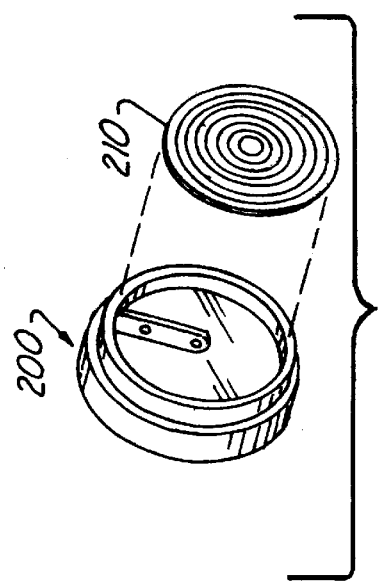
Fig. 2
Fig. 3

LIQUID LEVEL MONITOR

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

1. Field of the Invention

The present invention relates generally to level monitors, and more particularly to a liquid level monitor.

2. Description of Related Art

Liquid level monitors are used in many applications including uses in combination with other components to measure fluid flow variables in open channel flow arrangements. One such level monitor is referred to as a bubble flow meter or bubbler. The bubbler is suitable for various environmental operating conditions since it is unaffected by wind, fluctuation in air or liquid temperatures, turbulence, steam, foam on the surface, corrosive chemicals, debris, oil, floating grease , or lightning.

Known bubblers are instruments that compress air into a reservoir, slowly release that air through an orifice and allow it to flow out the end of an unrestricted tube placed at the bottom of a channel of water. The instrument has a pressure transducer that measures the air pressure after the orifice which pressure is equal to the water head above the end of the tube.

These bubble flow meters are a popular meter, but are not used for certain applications because of some shortcomings. For example, if there is considerable sediment in the channel, the tube may plug. Also, when the fluid head changes dramatically during short intervals of time, some water may enter the bubble tube then exit either when the level drops or when the bubble pressure increases. This wetted tube with an air supply grows algae which can eventually plug the tube. These plugging situations are somewhat alleviated by using a purge valve which is opened at timed intervals to bypass the orifice and release a high pressure stream of air to clear the end of the tube.

Further, since the meter is constantly bringing in air, a desiccant system is required to reduce the relative humidity of the air coming in so as not to damage the mechanics and electronics of the meter. This desiccant has a finite capacity and therefore requires periodic servicing. The compression of air, the need to continuously have air flow to keep water out of the end of the tube even though pressure readings may not be taking place, and the need to periodically purge, all raise the power consumption level to a point where a long term data logging meter using a bubbler is not feasible.

Those concerned with these and other problems recognize the need for an improved liquid level monitor.

BRIEF SUMMARY OF THE INVENTION

The present invention provides a liquid level monitor using a pressure actuated sensor to replace the open bubble tube. Air flows down the supply tube as in the bubbler, but rather than being released into the water, the air enters a chamber that has one movable wall, such as a diaphragm, that is acted on from the inside by pressurized air and from the outside by the hydrostatic head of the water. When the water pressure exceeds the chamber air pressure, the movable wall is pressed against an air outlet and does not allow air in the chamber to escape through the air outlet. One embodiment uses a diaphragm disposed over the air outlet; however, the concept may be extended to several other movable members, such as a piston with low actuation force. When the chamber air pressure exceeds the water pressure, the movable member moves away from the air outlet, releasing air and causing the chamber pressure to drop down to the water pressure.

The present invention provides several advantages over the bubble flow meter: air is not released into the water thereby eliminating the air tube plugging due to sediment and algae; the air system can be shut down at any time without the danger of the air tube plugging up; and since the air leaving the submerged sensor does not need to be released and it is still clean and dried, it can be returned to the meter to be compressed, thereby eliminating the need to service the desiccant. All of these features combine to create a more reliable, lower power and lower maintenance liquid level monitor.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 2 is an exploded perspective view of one embodiment of a sensor for a liquid level monitor;

FIG. 3 is a side elevation sectional view of the sensor including a movable diaphragm shown in a first position closing the outlet port so that pressure builds up within the chamber;

FIG. 4 is a side elevation sectional view similar to FIG. 3, but showing the movable diaphragm in a second position spaced from the outlet port;

FIG. 5 is a side elevation sectional view of another embodiment of the liquid level monitor having a sensor including a movable piston shown in a first position closing the outlet port; and FIG. 6 is a side elevation sectional view similar to FIG. 5, but showing the movable piston in a second position spaced from the outlet port.

DETAILED DESCRIPTION OF THE INVENTION

Figure 1:
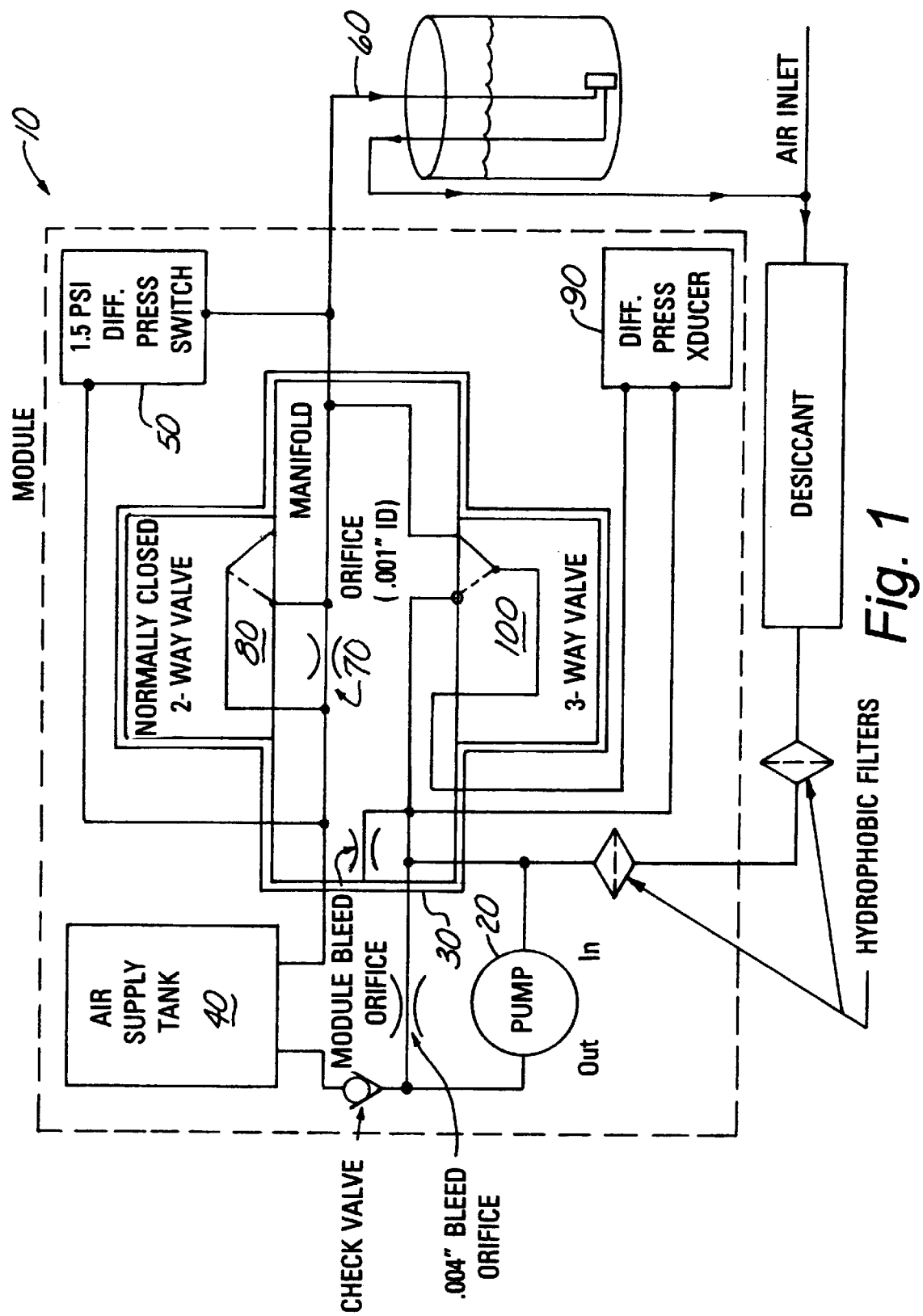
FIG. 1 is a schematic view showing the liquid level monitor of the present invention.

As can be seen by reference to the drawings, and in particularly to FIG. 1, the liquid level monitor 10 of the present invention is illustrated schematically. This system produces the pressurized air supply that regulates the rate of air supplied, measures the pressure, does bypass, drift compensation, and other functions.

A small high-efficiency pump 20 generates the pressurized air supply for the monitor 10. The suction side of the pump 20 connects to the outside of the housing 30 through a pump inlet port barbed hose connector. This vent is separate from the other components to prevent interference from the pumping cycles. The exhaust side of the pump connects to the air supply tank 40 which is pressurized by the pump 20.

A fixed set point pressure switch 50 monitors air pressure in the tank 40. The reference side of the differential pressure switch 50 connects to the air supply line 60. When the pressure in the tank 40 falls below 1.5 psig above the water pressure being measured, the pressure switch 50 turns the pump on for a fixed period of time. Thus, the system maintains pressure in the tank 40 at approximately 1.5 psig above the current water pressure.

The output from the air supply tank 40 leads to the air supply line tubing connector on the side of the case 30. The pressurized air in the tank 40 can take two possible paths to the air supply line 60. The normal route is through an orifice 70. This orifice 70 controls the rate of air escaping from the air supply line 60 establishing the flow rate.

The other path air can take to reach the air supply line 60 is through the bypass valve 80 which is an electrically operated valve. When this valve 80 turns on, air bypasses the orifice 70 and discharges directly into the air supply line 60. This valve 80 opens momentarily to release bursts of air when the pressure transducer 90 detects a rapidly rising liquid level. The flow meter 10 normally operates with a battery saving low flow rate, but these air bursts allow fast response to a sharply rising liquid level.

A temperature compensated solid state pressure transducer 90 measures the air pressure in the air supply line 60. The pressure is proportional to the liquid level. The pressure transducer 90 connects to the line 60 through the automatic drift compensation valve 100. The reference side of this transducer 90 vents to the outside of the case 30 through an external desiccator. The microprocessor (not shown) converts the output from this transducer 90 into level and flow rate.

The drift compensation valve 100 located directly across both ports of the pressure transducer 90 turns on at power up and from time to time after that to tie the input and reference ports of the transducer 90 together to compensate for any drift that might occur. The software determines how often this valve turns on.

When measuring flow rate, the liquid level monitor 10 is used with a primary measuring device, typically a weir, a flume, or other open channel flow arrangement where a known relationship exists between level and flow rate. The level measuring device 10 measures the liquid level in the flow stream. The level reading is converted into a properly scaled flow rate value.

The module contains microprocessor-controlled circuitry to calculate level from the signals produced by the pressure transducer 90 and communicates with the controller.

The liquid level monitor 10 works as follows. A small compressor 20 pumps air into a reservoir 40. This air is slowly released by an orifice into an air supply line 60. The other end of this line 60 is attached to a sensor body 200 (FIG. 2) submerged in the flow stream. Inside the housing 30, the line 60 also connects to one side of a differential pressure transducer 90. As air is released slowly into the line 60 by the orifice 70, pressure builds inside the sensor body 200 to force the diaphragm 210 away from the outlet 220. When there is enough pressure to counteract the hydrostatic pressure of the flow stream, the diaphragm 210 will be forced from the outlet 220. The amount of pressure required to force the diaphragm 210 from the outlet 220 is directly dependent on the hydrostatic pressure of the flow stream of the outside wall of the diaphragm 210.

The pressure transducer 90 inside the module 30 senses this pressure and converts it into an electrical signal that the module converts into a fluid level. The controller then calculates flow rate and total flow from the fluid level measurement and lookup tables for the primary device being used.

The module produces the pressurized air supply, regulates the rate of air, measures the pressure in the air supply tube 60, compensates for drift, and other functions.

The module measures the output of the pressure transducer 90 at zero pressure. When the module is first turned on, and every 15 minutes after that, the processor actuates the automatic drift compensation valve 100, which connects the input port of the pressure transducer 90 to the reference port. With the two ports connected, it then measures the output offset.

The module stores this offset reading in memory and uses it in level calculations. The repetition of this process causes any pressure transducer or amplifier drift to cancel out, eliminating the most significant cause of drift, especially when operating at low water levels.

The embodiment of the sensor body 300 illustrated in FIG. 5 operates in a like manner as the sensor body 200, except the diaphragm 310 is attached to a movable piston 315 that moves to close and open the outlet port 320. This design adds complexity, but the pressure balanced movable piston eliminates hysteresis of the diaphragm 210 on the seal at the outlet port 220. However, the movable piston design adds the friction of the piston that contributes to hysteresis.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A device for measuring a liquid level comprising:
   a sensor body including a chamber, inlet and outlet ports in communication with the chamber, and a movable member attached to the sensor body and having a first side in communication with the chamber, the sensor body being disposed at a known elevation within a liquid channel such that a second side of the movable member is in communication with liquid in the channel;
   the movable member being movable between a first position wherein its first side closes the outlet port when the pressure in the chamber is less than or equal to the pressure of the fluid liquid on the second side of the movable member, and a second position wherein its first side is spaced from the outlet port when pressure in the chamber is greater than the pressure of the liquid on the second side of the movable member.

2. The device of claim 1 wherein the movable member includes a flexible diaphragm.

3. The device of claim 2 wherein the movable member includes a piston attached to the diaphragm.

4. A method for measuring a liquid level in a liquid channel comprising the steps of:
   providing a sensor body including a chamber, inlet and outlet ports in communication with the chamber, and a movable member attached to the sensor body and having a first side in communication with the chamber, and a second side;
   supplying fluid through the inlet port into the chamber at a variable pressure;

the movable member being movable between a first position wherein its first side closes the outlet port when the pressure in the chamber is less than or equal to the pressure of a liquid on the second side of the movable member, and a second position wherein its first side is spaced from the outlet port when pressure in the chamber is greater than the pressure of the liquid on the second side of the movable member;

positioning the sensor body at a known elevation within the channel such that the second side of the movable member is in communication with liquid in the channel;

measuring the pressure in the chamber when the movable member is moved to the second position; and determining the level of liquid in the channel based on the measured pressure in the chamber.

5. The method of claim 4 wherein the movable member includes a flexible diaphragm.

6. The method of claim 5 wherein the movable member includes a piston attached to the diaphragm.

7. The method of claim 4 wherein the fluid supplied through the inlet port into the chamber is air.

* * * * *